US012322895B1

(12) United States Patent
Pineault

(10) Patent No.: US 12,322,895 B1
(45) Date of Patent: Jun. 3, 2025

(54) CONNECTOR NUT

(71) Applicant: The United States of America as represented by the Secretary of the Navy, Newport, RI (US)

(72) Inventor: David G Pineault, Tiverton, RI (US)

(73) Assignee: The United States of America as represented by the Secretary of the Navy

( * ) Notice: Subject to any disclaimer, the term of this patent is extended or adjusted under 35 U.S.C. 154(b) by 356 days.

(21) Appl. No.: 17/945,179

(22) Filed: Sep. 15, 2022

(51) Int. Cl.
*H01R 13/512* (2006.01)
*H01R 13/595* (2006.01)
*H01R 13/52* (2006.01)

(52) U.S. Cl.
CPC ......... *H01R 13/512* (2013.01); *H01R 13/595* (2013.01); *H01R 13/52* (2013.01)

(58) Field of Classification Search
CPC ..... H01R 13/512; H01R 13/595; H01R 13/52
See application file for complete search history.

(56) References Cited

U.S. PATENT DOCUMENTS 5,178,559 A 1/1993 Mello
6,887,091 B1 * 5/2005 Wu .................... H01R 13/6335 439/352
7,419,402 B2 * 9/2008 Carnahan ........... H01R 13/5841 439/470
8,568,158 B2 * 10/2013 Mangus ................. H01R 13/52 439/465
11,349,254 B2 * 5/2022 Reibel .................... H01R 13/59
2013/0244487 A1 * 9/2013 Van Swearingen .. B23K 20/129 439/583
2017/0133772 A1 * 5/2017 Paynter ................ H01R 9/0521

FOREIGN PATENT DOCUMENTS

CN 203983933 U * 12/2014
FR 2946809 A1 * 12/2010 ........... H02G 3/0658
KR 820061 B1 * 4/2008 ............... H01R 4/66

OTHER PUBLICATIONS

Machine Translation FR 2946809 A1, (dated Dec. 17, 2010) (Year: 2024).*

* cited by examiner

*Primary Examiner* — Travis S Chambers
(74) *Attorney, Agent, or Firm* — James M. Kasischke; Michael P. Stanley; Jeffry C. Severson

(57) ABSTRACT

A split connector nut is provided for coupling a cable connector. The connector nut includes a pair of semi-arcuate half-bodies with each half-body having a pair of mating surfaces and a concave inner surface having screw threads between the mating surfaces. A fastener protrudes from one mating surface and an alignment pin protrudes from another mating surface. There is an alignment aperture in the one mating surface adjacent to the fastener, located to correspond with the alignment pin of an adjacent half-body. There is a receiving aperture in the other mating surface adjacent to the alignment pin, located to correspond with the fastener of an adjacent half-body. Each half-body includes an inwardly disposed retaining shoulder around a back of the half-body, which is adapted to engage a retaining groove on the cable connector.

1 Claim, 7 Drawing Sheets

CONNECTOR NUT

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

The present application claims the benefit of U.S. Provisional Patent Application Ser. No. 63/358,898 filed on Jul. 7, 2022 with the invention entitled "Split Nut" by the inventor, David G Pineault.

BACKGROUND OF THE INVENTION

1) Field of the Invention

The present invention is directed to a split nut assembly that can be used as a replacement for a coupling nut on a cable connector body.

2) Description of the Related Art

Corrosion and particularly galvanic corrosion, causes coupling nuts on marine cables and connectors to deteriorate. In-service cable repair is limited by the inability to disassemble a corroded portion of a cable connector coupling nut that fastens the cable to a component mating connector. After a connector is molded to a cable during manufacture; the cable overmold does not allow for conventional disassembly nor the installation of a new coupling nut. If the coupling nut is damaged, due to galvanic corrosion or other damaging factors, the cable may not maintain connection to a component mating connector; thereby, rendering the cable impractical for use.

The standard method to repair this type of damage is to splice a new connector with an undamaged coupling nut to the cable. This type of splice is particularly costly for systems that have embedded cables. The cost associated with premature cable failure can be high because repair and replacement of premature failures are often time-consuming and must be coordinated through several repair or refit cycles; thereby, extending the time of full system repair.

In the Mello reference, U.S. Pat. No. 5,178,559, a stress relief backshell assembly of two halves allows the backshell to be fastened on either side of a cable. The backshell elements are assembled to an electrical connector without cable/connector disassembly. The stress relief backshell prevents stress from affecting the connection between the cable elements and the connector and thus causing a gap in the connection. The backshell assembly includes two backshell halves with ring shaped front portions for engaging and gripping the cable end of the connector, ears extending rearward along the cable, and clamp members which clamp to the ears compressing the cable therebetween.

In regard to the known prior art, a minimally intrusive device is therefore needed to replace a corroded or damaged coupling nut with the result of significantly extending the service life of marine cables and connectors.

SUMMARY OF THE INVENTION

A connector nut assembly is provided for coupling a cable connector. The connector nut includes a pair of semi-circular half-bodies that define an inner diameter once the connector nut is assembled. Each half-body has a first mating surface, a second mating surface, and a threaded concave inner surface between the first mating surface and the second mating surface.

A fastener protrudes from the first mating surface and an alignment pin protrudes from the second mating surface. An alignment pin aperture is positioned in the first mating surface adjacent to the fastener for accommodating the alignment pin of an adjacent half-body. There is a fastener receiving aperture in the second mating surface adjacent to the alignment pin. The receiving aperture can accommodate the fastener of an adjacent half-body. Each half-body includes an inwardly disposed retaining shoulder which is adapted to engage a retaining groove on the cable connector.

The invention disclosed herein can extend the service life of marine cables by replacing a corroded or damaged coupling nut. The inventive concept is applicable to numerous connector designs. After removing a corroded or damaged coupling nut, the inventive split nut assembly may be installed on in-service cables; thereby, avoiding the need to splice a new connector onto the in-service cable.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

A two-piece or split connector nut is provided that can be rapidly assembled to an in-service cable connector body.

Figure 1:
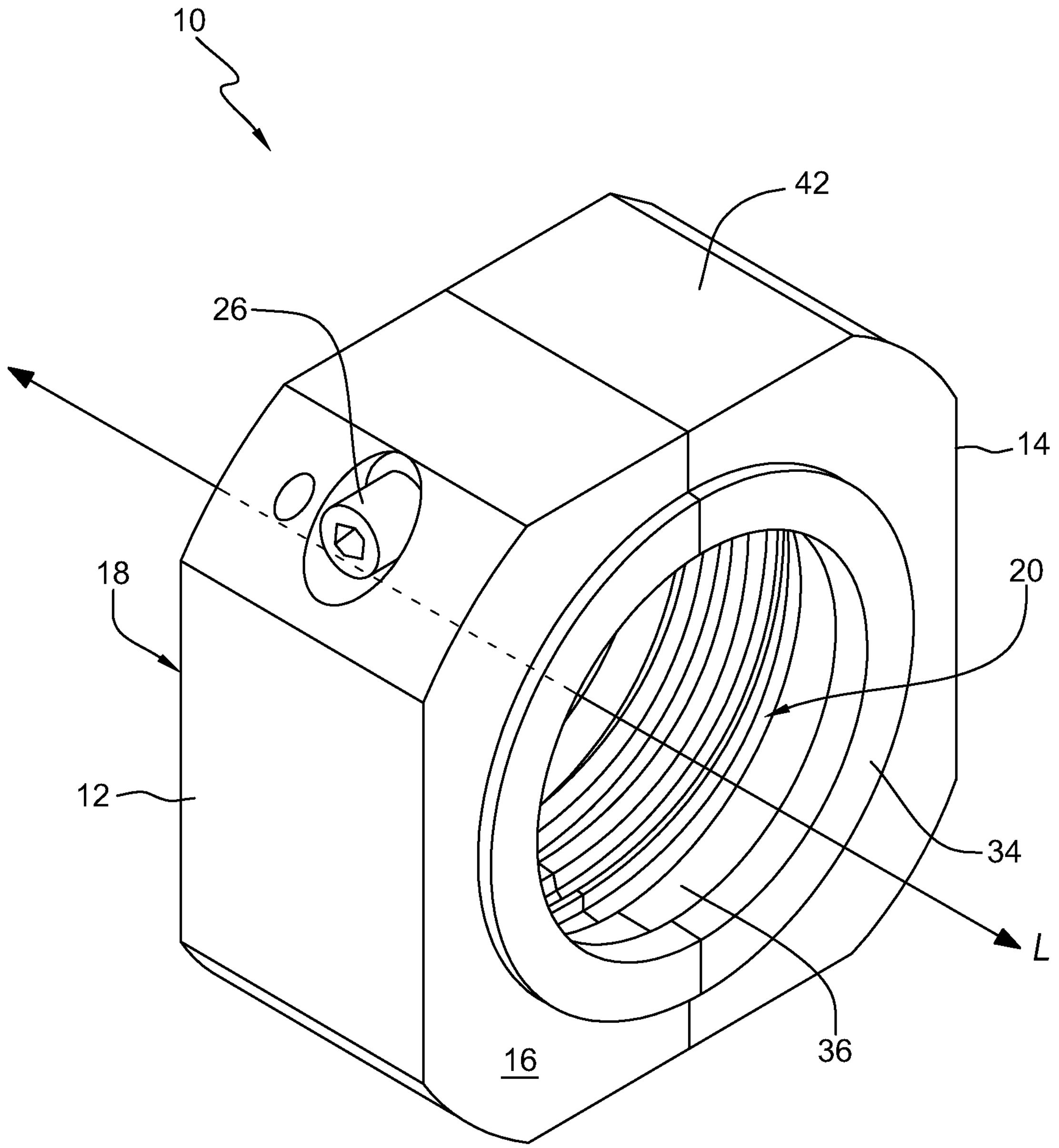
FIG. 1 is a perspective view of an assembled split nut.

FIG. 1 illustrates a perspective view of an exemplary split connector nut assembly 10. The connector nut assembly 10 includes a first half-body 12 and a second half-body 14. Each half-body 12, 14 has an arcuate shape extending approximately 180° around a longitudinal axis "L" with a first end face 16 and a second end face 18. An inner surface 20 of the arcuate shape is concave and has screw threads. The first half-body 12 and second half-body 14 are symmetric such that the half-bodies can mate with each other.

Figure 2:
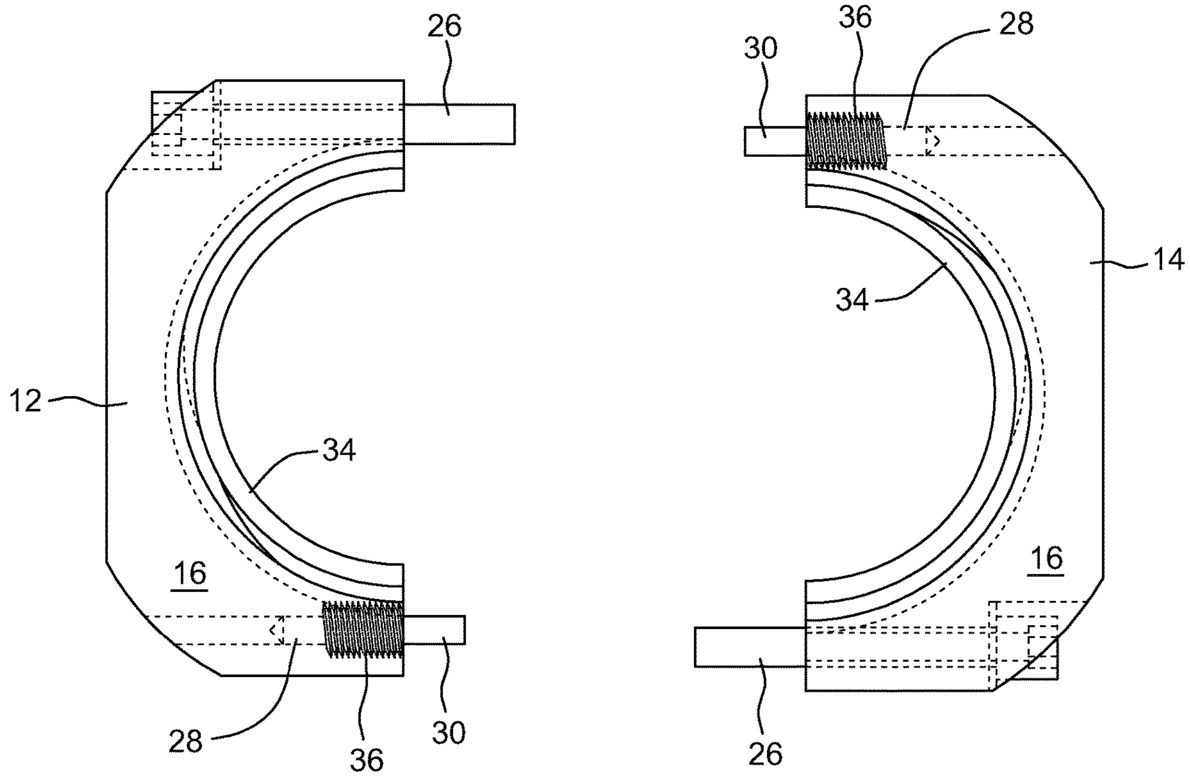
FIG. 2 is a front view two halves of the split nut of FIG. 1.
Figure 3:
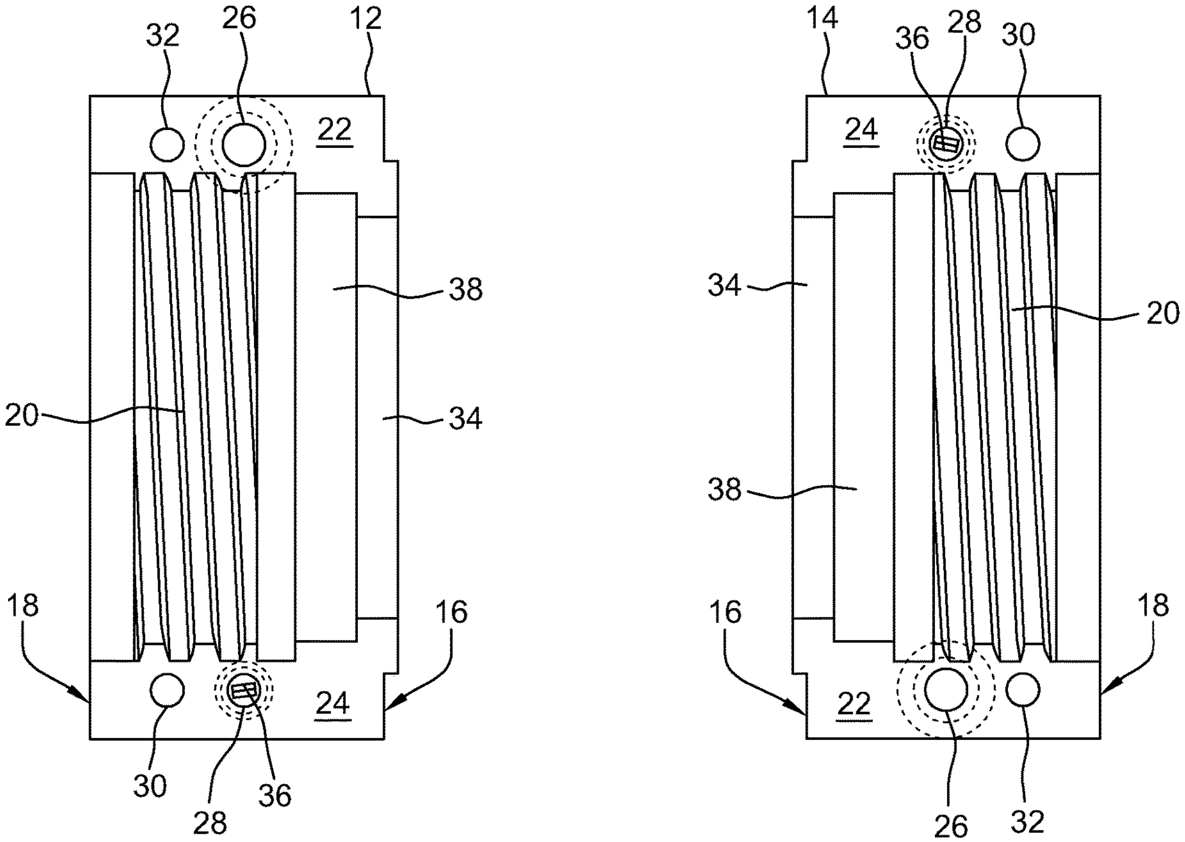
FIG. 3 is a side view of the two halves of the split nut of FIG. 1.

FIG. 2 and FIG. 3 depict the first half-body 12 and second half-body 14 of the connector nut assembly 10 with the first half-body and the second half-body presenting a semi-circular profile. Each half-body 12, 14 includes a first inner mating surface 22 and a second inner mating surface 24. The first inner mating surface 22 and a second inner mating surface 24 contact each other when the connector nut assembly 10 is assembled. That is, the first inner mating surface 22 of the first half-body 12 contacts the second inner mating surface 24 of the second half-body 14 when assembled.

An inserted fastener 26 protrudes from the first inner mating surface 22. The fastener 26 can be a threaded screw, such as a socket head cap screw.

A fastener receiving aperture 28 is located in the second mating surface 24. The fastener receiving aperture 28 is sized to engage with the fastener 26 of an adjacent half-body. An alignment pin 30 protrudes from the second mating surface 24. The alignment pin 30 is adjacent to the fastener receiving aperture 28 in the second mating surface 24. An alignment pin aperture 32 is provided in the first mating surface 22 adjacent to the fastener 26. The alignment pin aperture 32 is sized and aligned to engage the alignment pin 30 of an adjacent half-body.

A retaining shoulder 34 is disposed adjacent the first end face 16. When the connector nut assembly 10 is assembled; the diameter of the retaining shoulder 34 is less than the diameter of the inner surface 20.

In some embodiments, the fastener 26 is centrally located between edges of the first end face 16 and second end face 18 on the first inner mating surface 22. Similarly, the fastener receiving aperture 28 is centrally located between edges of the first end face 16 and the second end face 18 on the second inner mating surface 24. The location of the fastener 26 and the fastener receiving aperture 28 provide for equal loading on each half-body 12, 14 under conventional loading.

The alignment pin 30 may be located between the fastener receiving aperture 28 and the edge of the second end face 18 with the alignment pin aperture 32 located between the fastener 26 and the edge of the second end face 18. This is on an opposite side of the fastener 26 and the fastener receiving aperture 28, respectively, from the retaining shoulder 34.

The first half-body 12 and second half-body 14 of the connector nut assembly 10 may be manufactured by machining stainless steel as two separate halves, in which case the fastener receiving aperture 28 can be internally threaded to mate with the fastener 26. In some embodiments, the first half-body 12 and second half-body 14 may be manufactured of plastic, such as polyphenylsulfone, in which case a helicoil 36 can be inserted in the fastener receiving aperture 28 to mate with the fastener 26.

Figure 4:
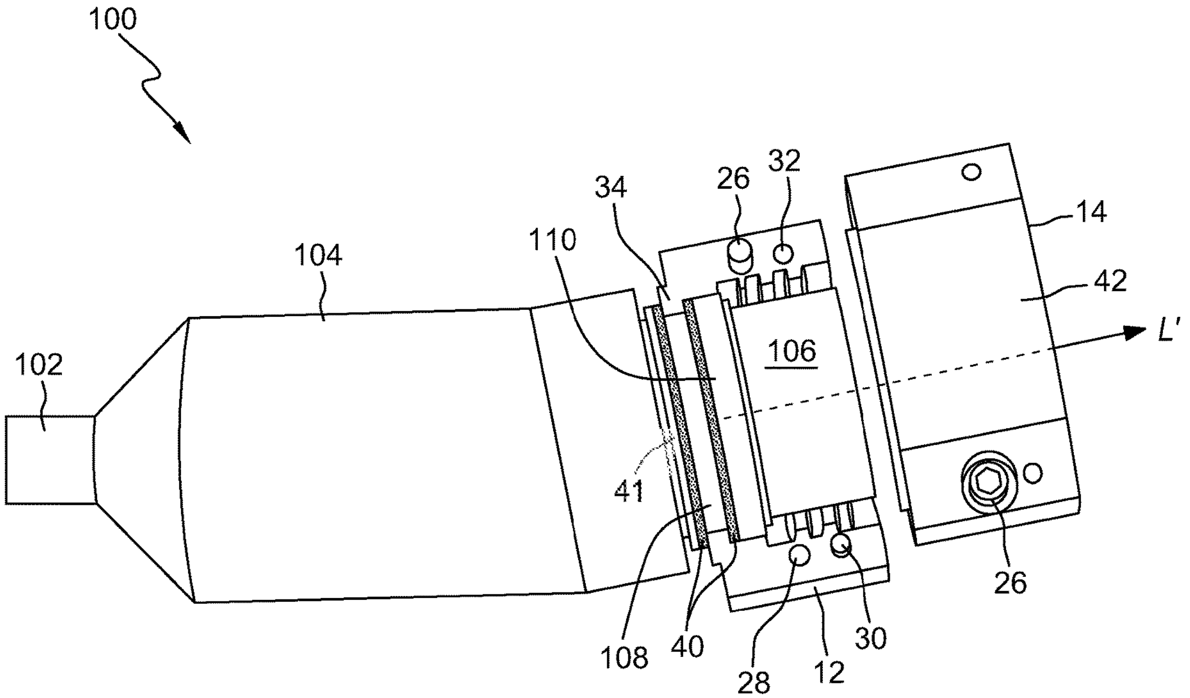
FIG. 4 is an isometric view of a split nut installation to a cable connector body.

Referring to FIG. 4, a cable assembly 100 may include a cable 102 having numerous and individual electrical lines and an overmold 104 that is used to attach a connector body 106 having connector pins for each of the electrical lines to the cable. By design, the connector body 106 does not rotate in order to avoid twisting or breaking of the connector pins. The connector body 106 includes a retaining groove 108 and an alignment flange 110.

As shown in the figure, the retaining shoulder 34 of the first half-body 12 fits in the retaining groove 108 behind the alignment flange 110 of the connector body 106. The alignment flange 110 is positioned on an alignment surface 38 of each half-body 12, 14 (See FIG. 3). In some embodiments, a pair of washers 40 may be provided against the vertical surfaces of the retaining groove 108. Such washers 40 are preferably made of Delrin plastic or other appropriate material as known in the art. The Delrin washer movement is secured by a snap ring 41.

Figure 5:
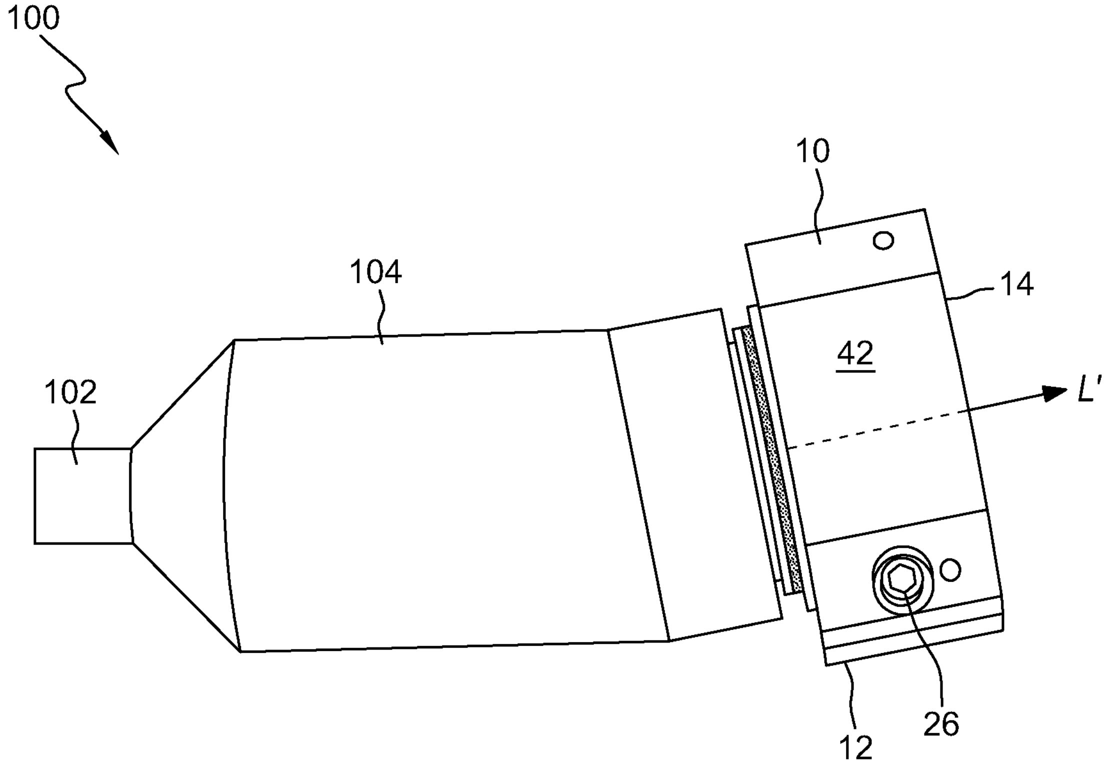
FIG. 5 is an isometric view of a split nut installed to a cable connector body.

FIG. 5 shows the second half-body 14 of the connector nut assembly 10 connected to the first half-body 12 on the connector body 106. The retaining shoulder 34 of the second half-body 14 fits in the retaining groove 108 of the connector body 106 and the alignment flange 110 of the connector body 106 is positioned on the alignment surface 38 of the second half-body 14 (See FIG. 3).

Assembly of the first half-body 12 and the second half-body 14 aligns the fasteners 26 and alignment pins 30 with their respective fastener receiving apertures 28 and alignment pin apertures 32; thereby, securing the connector nut assembly 10 to the connector body 106 in FIG. 5. The connector nut assembly 10 is able to rotate around the longitudinal axis "L" of the connector body 106.

Once the first half-body 12 and the second half-body 14 are fastened to one another; the internal screw threads on the inner surface 20 align to form a helical path. The outer surface 42 of each half-body 12, 14 can have a conventional square shape with rounded edges to receive a tightening tool such as a conventional open face wrench or strap wrench. Also, the outer surface 42 can be suited to any desired geometry for an intended application.

Figure 6:
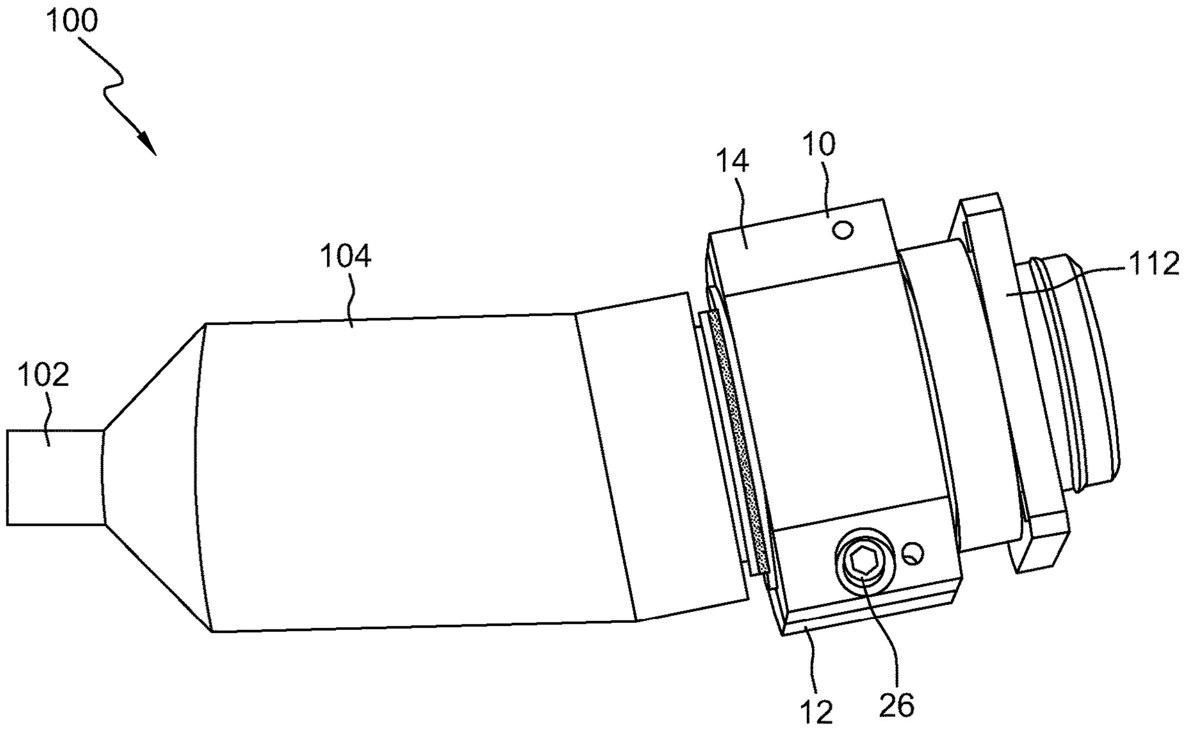
FIG. 6 is an isometric view of a split nut installed to a cable connector body connected with a mating receptacle connector.
Figure 7:
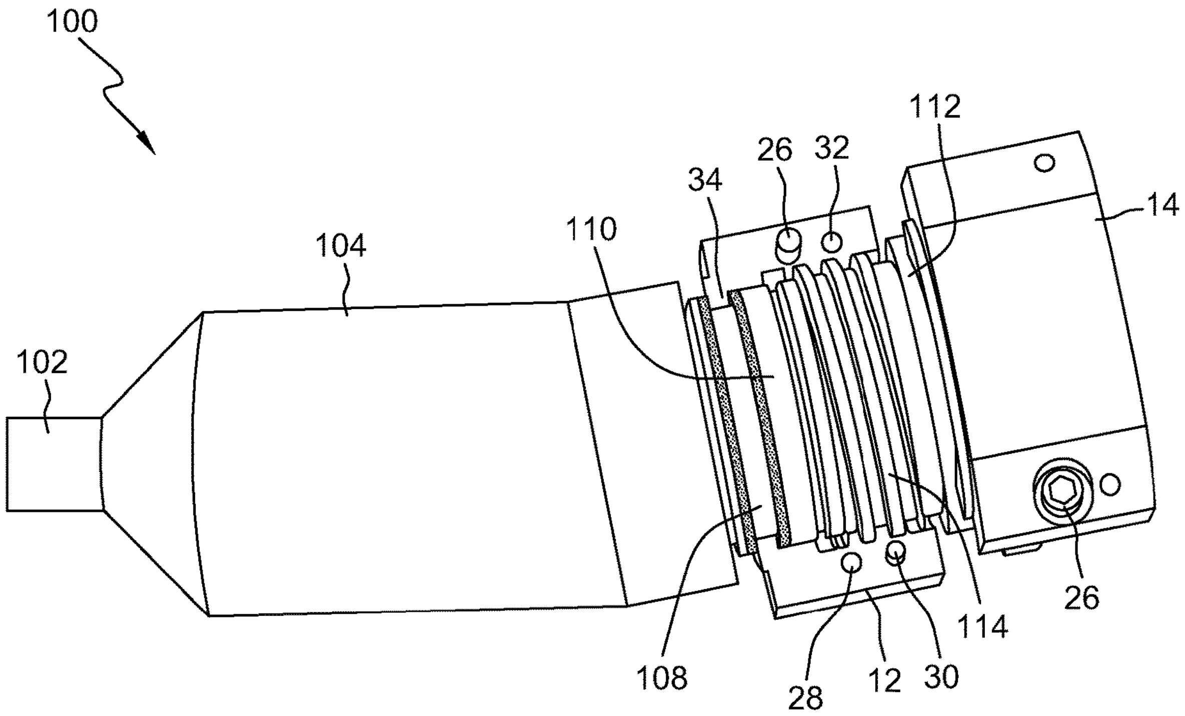
FIG. 7 is an isometric view of a split nut installed to a cable connector body connected with a mating receptacle connector and showing thread engagement between the split nut and the receptacle connector.

As shown in FIG. 6 and FIG. 7, the cable connector body 106 may be mated to a receptacle 112. The receptacle 112 does not rotate in order to avoid twisting or breaking of the connector pins. Either the connector body 106 or the receptacle 112 can have connector pins or sockets to establish the connection for the electrical lines in the cable 102. Screw threads 114 on the receptacle 112 engage with the internal screw threads on the inner surface 20 of the split connector assembly 10. For illustration purposes, FIG. 7 shows the receptacle 112 mated to the cable connector body 106 with the second half-body 14 removed to demonstrate the thread engagement.

The invention allows the rapid installation of a connector nut assembly 10 to an in-situ cable connector; thereby, avoiding a complicated and time-consuming cable splice.

Unlike the connector of the prior art Mello reference, the connector nut assembly 10 of the present invention is 17-4 PH precipitation hardened martensitic stainless steel material for applications requiring high strength and a modest level of corrosion resistance. The parts are two split connector nut halves, two bolts and two alignment pins. The connector nut of is preferably made from RADEL 5500 and has eight parts, two split nut halves, two bolts, two alignment pins, two flat washers and two helicoils. However, the stress relief backshell of the Mello reference consists of eight parts, two stress relief halves, two clamps and four fasteners.

The connector nut assembly 10 of the present invention is designed to only clamp onto the connector body and to not touch any other part of the connector. However, the stress relief backshell of the Mello reference is designed to clamp onto both the connector body and the cable. The connector nut assembly 10 of the present invention does not compress the cable nor the connector and does not provide cable stress relief. As such, the connector nut assembly 10 may be used regardless of a stress relief apparatus installed on the cable end of the connector.

The connector nut assembly 10 is also designed to be turned either by hand or by using a wrench in order for threads of the connector nut assembly to engage with the threads of the receptacle. In contrast, stress relief is not designed to be turned and remains stationary once installed. The connector nut can mate and securely fasten a connector body (plug) to a connector receptacle.

Each threaded half of the connector nut assembly 10 consists of one threaded aperture or hole (a threaded aperture or hole with helicoil for material RADEL 5500) to accept installation of a fastener and one through aperture with countersink to seat the fastener on the other half to join the two halves. This design feature is intentional for equal loading on each half of the connector nut.

Concentrated loading during a shock event is generally a cause for failure. The type of symmetry for the connector nut assembly 10 is a rotational symmetry and more specifically, a rotational symmetry of 180 degrees. In other words, the nut half fits into itself two times in a complete 360 degree rotation. Point symmetry is also applicable in this design.

In an alternative design, the connector nut assembly 10 can be designed with o-ring retention surface 50 adjacent to the alignment surface 38. The o-ring retention surface 50 is not a seal surface. The alignment pins 30 pins ensure that when the connector nut is assembled; the o-ring retention surface 50 and threads accurately line up. The alignment pins 30 also reduce shear stress on the fasteners 26 that hold the half bodies 12, 14 together during loading such as during a shock event.

For a threaded surface, the alternative design with the alignment pins 30 ensures that the thread helix of each half-body 12, 14 is accurately aligned; thereby, ensuring an adequate thread clearance after assembly. This design reduces the potential for galling in the case of metal-on-metal contact surfaces. Galling is when two surfaces in contact seize as a result of cold welding. The problem that is also known as "adhesive wear" is most commonly seen when tightening bolts made from materials such as stainless steel, aluminum or titanium with similar hardness. For the o-ring retention surface, the alignment pins ensure that the surface remains flat after so that the o-ring is not damaged during the connector mating process.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A split connector nut for coupling a cable connector, said split connector nut comprising:

a first arcuate half-body extending approximately one hundred and eighty degrees around a longitudinal axis of said split connector nut, said first arcuate half-body having a first mating surface, a first end face and a retaining shoulder adjacent to said first end face;

a second arcuate half-body symmetric with said first arcuate half-body, said second arcuate half-body extending approximately one hundred and eighty degrees around the longitudinal axis of said split connector nut and said second arcuate half-body having a second mating surface capable of mating with said first mating surface of said first arcuate half-body to define an inner diameter once each said half-body is assembled with said other half-body;

a first concave and threaded inner surface within said first mating surface;

a second concave and threaded inner shoulder within said second mating surface;

a first fastener protruding from said first mating surface, said first fastener centrally located between said first end face and said second end face;

a second fastener protruding from said second mating surface;

a first alignment pin protruding from said first mating surface;

a second alignment pin protruding from said second mating surface;

a first fastening receiving aperture in said first mating surface adjacent to said first alignment pin, said first fastening receiving aperture capable of accommodating said second fastener of said second half-body;

a second fastener receiving aperture in said second mating surface adjacent to said second alignment pin and centrally located in said second mating surface, said second fastener receiving aperture capable of accommodating said first fastener of said first half-body;

a first alignment pin aperture in said first mating surface adjacent to said first fastener, said first alignment pin aperture located to correspond with said second alignment pin of said second arcuate half-body;

a second alignment pin aperture in said second mating surface adjacent to said second fastener, said second alignment pin aperture located to correspond with said first alignment pin of said first arcuate half-body; and an inwardly disposed retaining shoulder within said first half-body adapted to engage a retaining groove on the cable connector;

wherein each said half-body comprises an alignment surface between said inwardly disposed retaining shoulder and said threaded surface;

wherein a diameter of said inwardly disposed retaining shoulder is less than a diameter of said first concave and threaded inner surface;

wherein a diameter of said inwardly disposed retaining shoulder is less than a diameter of said second concave and threaded inner surface;

wherein each said half-body comprises plastic and wherein said second fastener receiving aperture further comprises a threaded helicoil to correspond to said first fastener.

* * * * *